E. P. FOLLETT.
FISH CLEANING MECHANISM.
APPLICATION FILED JUNE 28, 1915. RENEWED APR. 18, 1917.

1,228,311.

Patented May 29, 1917.
2 SHEETS—SHEET 1.

WITNESSES:
L. L. Burket
E. Rosenberg

INVENTOR.
E. P. Follett,
BY A. S. Pattison.
ATTORNEY.

E. P. FOLLETT.
FISH CLEANING MECHANISM.
APPLICATION FILED JUNE 28, 1915. RENEWED APR. 18, 1917.

1,228,311.

Patented May 29, 1917.
2 SHEETS—SHEET 2.

WITNESSES:
L. L. Burket
E. Rosenberg

INVENTOR.
E. P. Follett,
BY A. S. Pattison.
ATTORNEY.

UNITED STATES PATENT OFFICE.

EDWARD P. FOLLETT, OF DULUTH, MINNESOTA.

FISH-CLEANING MECHANISM.

1,228,311.  Specification of Letters Patent.  Patented May 29, 1917.

Application filed June 28, 1915, Serial No. 36,796. Renewed April 18, 1917. Serial No. 163,038.

*To all whom it may concern:*

Be it known that I, EDWARD P. FOLLETT, a citizen of the United States, residing at Duluth, in the county of St. Louis and State of Minnesota, have invented certain new and useful Improvements in Fish-Cleaning Mechanisms, of which the following is a specification, reference being had therein to the accompanying drawing.

My invention relates to improvements in fish cleaning mechanisms and relates principally to such a mechanism which is manually operated.

Another object of the present improvement is to devise such an apparatus which will decapitate a number of fish, thoroughly clean and salt them, all of the fish undergoing the above noted operations simultaneously and the machine operating with the least expense and effort possible.

Other objects and advantages of the present improvement will be set forth in the following description and drawings in which, Figure 1 is a front elevation of my improved mechanism showing three decapitated fish in holders provided for them.

Figure 1:
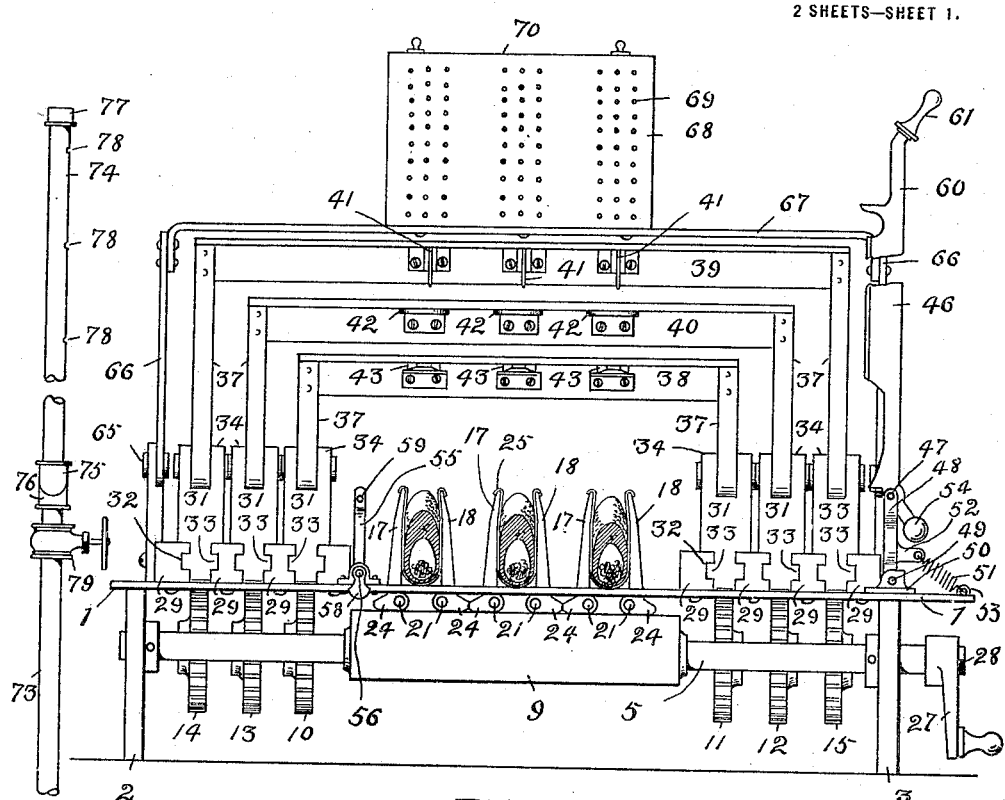

Referring now to the drawings in detail in which like reference numerals designate similar parts throughout the several figures, 1 represents a horizontally disposed floor supported upon two side walls 2 and 3, and an end wall 4. The base of the machine being constructed in this manner may be readily moved from place to place and installed upon any form of table or bench desired. Within the side walls 2 and 3 are journaled in any suitable manner revoluble shafts 5, 6, 7 and 8. The shaft 5 has an elongated cylinder 9 eccentrically mounted thereupon and positioned midway its ends, the said cylinder being designed to revolve beneath the floor 1. Each of the shafts 6, 7 and 8 have a pair of spur gears or pinions rigidly fixed upon them, one pinion being adjacent each end of each shaft. The pinions upon the shaft 6 are indicated by the numerals 10 and 11; those upon the shaft 7 are designated 12 and 13; and those upon the shaft 8 are designated 14 and 15. The shaft 5 is journaled so as to be transverse the front of the standard, and directly above it suitable openings 16 are formed within the floor 1 and through which the pivotal fish-holding elements extend.

The fish-holding elements are arranged in pairs, each of which comprise two upwardly extending relatively thin rectangular shaped metal wings 17 and 18. These fish holding elements are shown in detail in Fig. 2. Each of the wings 17 and 18 is formed with a downwardly projecting portion 20 at its front end, and a downwardly extending portion 19 at its rear end which forms bearings for shafts or rods 21 mounted therewithin. The shafts are pivotally mounted within suitable transverse angle bars 22 and 23 securely fixed transverse the under front side of the floor 1. The downwardly extending portion 20 of each wing 17 and 18 has a lateral extension 24 forming a crank arm which is adapted to engage the surface of the eccentrically mounted cylinder 9. Suspended from the uppermost edges of the wings 17 and 18 and extending downward to a point practically level with the top of the floor 1, is a fish holding saddle 25 which is formed of a relatively thin piece of spring metal such as brass or the like, and so folded upon itself as to normally remain in an open or separated position. When the saddle 25 is placed upon the wings 17 and 18 it will tend to normally keep the said wings separated when the eccentric 9 is turned with its lesser projection engaging the crank arms 24—24. When the shaft 5 is revolved to bring the greater projection of the eccentric cylinder 9 in engagement with the crank arms 24—24, the said crank arms will be raised to a position parallel with the shafts 21—21 which movement will close the wings 17 and 18 to the position shown in Fig. 1. When the wings are in their closed position, they will firmly engage and hold the fish in a position so that they may be readily operated upon. The saddle 25 may project rearwardly as at 26 to accommodate different lengths of fish to be operated upon, but it is understood that as near as possible, a relatively uniform size of fish are to be cleaned at one time in order to derive the best benefits from the mechanism. A hand crank 27 is designed to fit upon a squared end 28 of the shaft 5, which crank may be readily slipped off of the shaft 5 and applied to any one of the other shafts 6, 7, or 8 when it is desired to rotate them for purposes hereinafter to be set forth.

I have illustrated in the drawings three different sets of fish holding receptacles, and the device is arranged so as to coöperate with this member. However, it is to be understood that the mechanism may be duplicated so as to accommodate any number of fish desired and the description and operation of a single pair of holders as above set forth applies to all such members, as they are identical in all respects.

The description of the elements of the machine for holding and operating the different sets of knives and a description of these knives will now be set forth. Spaced a distance back of the line parallel with the extreme projecting ends 26 of the fish holding saddle 25 are a series of longitudinal guide-blocks 29 which are securely fastened to the upper surface of the floor 1 by means of bolts or rivets 30. There are four of these guide-blocks mounted upon either side of the floor 1 and arranged parallel to each other, and slidably supported intermediate each pair is a rack supporting member 31. The inner oppositely disposed edges of the guide-blocks 29 are milled out longitudinally forming a rectangular groove 32 therein within which groove is slidably mounted a similarly shaped rib 33 formed upon the outer edges of the rack supporting members 31, whereby the said rack supporting members may slide back and forth in the said grooves. The rack supporting members 31 are of a length preferably somewhat greater than the blocks 29 and are provided at their front ends with rectangular shaped upwardly projecting head portions 34 having rectangular shaped channels 35 milled therethrough within the rearward extremity of which the lower ends of rack supporting arms 37 are pivotally mounted at 36. There are two arms 37 for each rack and the lowermost, or inner rack comprises two arms 37—37 and a cross bar 38; the outermost rack comprises two arms 37—37 and a cross bar 39; and the intermediate rack comprises two arms 37—37 and a cross bar 40. It is to be understood that all of the arms 37—37 are similarly mounted upon the upwardly extending portions 34 of the members 31. The three racks above described are formed for the purpose of supporting various sets of knives which operate upon the fish. Since the arms 37 of the racks are pivotally supported at their lower ends, the said racks may be lowered by hand to any desired position longitudinally of the fish which are held in the holders for engagement therewith. When one of the racks is lowered, the arms 37—37 thereof descend within the channels 35—35 in the head blocks 34—34 and are firmly guided laterally thereby. They will descend until the arms 37—37 are in a position parallel with the blocks 31—31 at which time the lowermost edge of the said arms will rest upon the bottom of the channels 35—35 and thereby determine the lowermost limit of the said arms, the fish engaging knives within the racks being so arranged as to properly perform their functions when the bars 37 have reached this pre-determined point. The connecting bars 38, 39 and 40 of the racks are preferably formed of angle iron and securely riveted to the ends of their respective arms 37—37 as is clearly shown in Fig. 3.

A detailed description of the knives which are attached to the racks will now be taken up. Three fish operating knives 41 are securely fastened in any desired manner to the bar 39 of the outermost rack and project forward at right angles thereto, these knives being set just a trifle to one side of the center line of each fish when they are set in the holders. The object of this is to cause the knives to engage the fish just to one side of the backbone thereof to prevent engaging the said backbone during the operation of cutting. Three scraper or eviscerating blades 42 are securely fastened to the bar 40 and are placed in a line with the fish when they are held within the holders.

Figure 3:
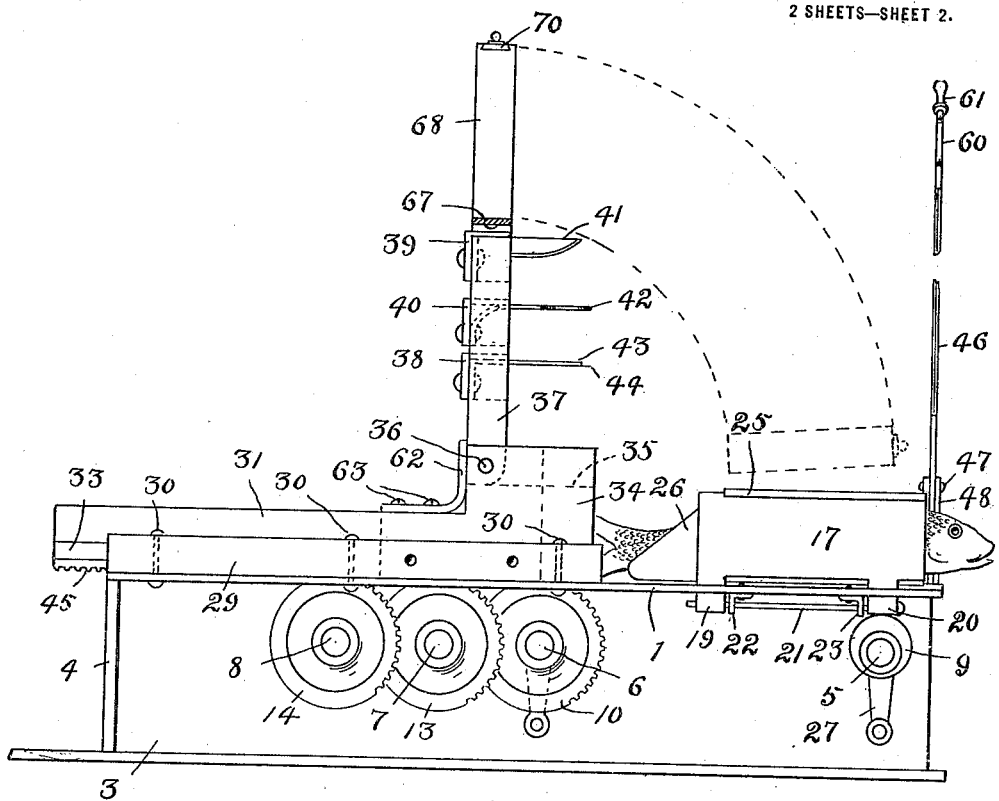
Fig. 3 is a side elevation of Fig. 1 having certain portions removed for convenience in illustration.

The blades 42 are of thin resilient metal preferably somewhat spoon-shaped at their free ends and bent at right angles at their opposite ends and fastened directly to the bar 40 as is clearly shown in Fig. 3. The resilient property of these eviscerating blades is to prevent their mutilating the fish in any manner when in operation and are only for the purpose of removing the entrails of the fish. Three intestinal severing knives 43 are securely fastened in any desired manner to the bar 38 and are placed in direct alinement with the three fish when in their holders, the said knives being arranged at right angles to the bar 38. The knives 43 are formed of relatively stiff material somewhat reduced in width at their lower ends, and they terminate in a thin rectangular-shaped cutting blade 44 which when brought into action and forced to their lowermost limit within the fish are designed to sever the recta of the fish close to the posterior openings therein.

Figures 4, 5, 6:
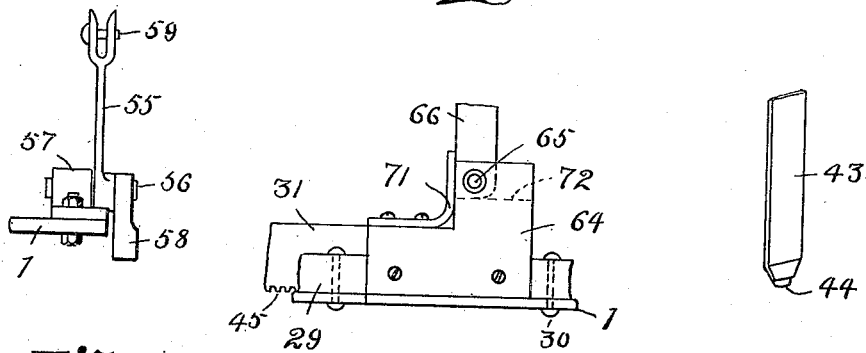
Fig. 4 is a side elevation of the standard attachment to which the salting mechanism of the device is attached.
Fig. 5 is a perspective view of a portion of the intestine severing knife.
Fig. 6 is an enlarged side elevation of the auxiliary standard for holding the decapitating knife.

The means for moving the racks longitudinally so that when they are swung radially the knives carried thereby will engage the fish consists in providing the six members 31 of the rack upon their lower faces with a cogged surface 45 which meshes with their coöperating pinions mounted upon the shafts 6, 7 and 8. The racks 45 mesh with the pinions as follows:

The members 31—31 of the outermost rack mesh with the pinions 14 and 15; the members 31—31 of the innermost rack mesh with the pinions 10 and 11; and the members 31—31 of the intermediate rack mesh with the pinions 12 and 13. The various racks may thus be moved back and forth by the revolving of their coöperating pinions which results may be accomplished by manual power applied to the corresponding shafts as desired, and by means of one or more cranks as above described. It is also to be understood that the racks may be operated back and forth by manual force applied directly to the various blade supporting bars 38, 39 and 40 if such an operation is preferred to the crank system, which would preferably be used principally in smaller sized machines such as are illustrated herein. Where a machine of this character is made sufficiently large to operate upon, say ten of fifteen fish simultaneously, then doubtless the crank method of operating the racks through the medium of the pinions would be the best form to employ. The arms 37—37 of the various racks are maintained normally in a vertical position and thereby hold the knives out of engagement with the fish by means of suitable pieces 62 of spring metal bent at substantially right angles and placed within the angle formed back of the heads 34 and on the top surface of the members 31, each spring being securely fastened to the top of the said member 31 by suitable rivets or screws 63. The upwardly projecting free ends of the spring 62 will engage the rear wall of the arms 37 and normally tend to keep them in alinement therewith as is evident. A decapitating knife 46 is pivotally mounted upon the floor 1 and in a location to properly engage the necks of the fish when brought into action. This knife is pivotally connected at 47 to a normally vertically extending link or standard 48 which in turn is pivotally mounted at 49 within a suitable support 50 securely fastened to the floor 1. The link 48 is retained normally in a vertical position by means of a spring 51 engaging an integral projection 52 of the link at one end and fastened to the floor 1 at its opposite end at the point 53. The knife 46 is retained normally in a vertical position within the link 48 by means of a counter-weight 54 formed integral therewith and extending in a substantially opposite direction from the pivotal point 47 to that of the knife blade. An auxiliary pivoted standard 55 is fixed to the floor 1 upon the opposite side of the fish holders to that of the knife support 48, but arranged in direct alinement with the said support. This standard is pivoted at 56 within a support 57 securely fixed to the floor 1, and may be provided with any suitable means for keeping it normally in an upright position. The means here shown for accomplishing this result is a depending counter-weight 58 rigidly fixed to the pivot 56 upon which the standard is fixed, whereby the said standard is normally retained in a vertical position as shown. The upper end of the standard 55 as is shown in Fig. 6 is bifurcated and supplied with a cross pin 59 for engagement with a shank 60 of the free end of the decapitating knife 46 when the latter is brought down for the decapitating process. A handle 61 is formed upon the extreme end of the knife 46 to render the operation of the same more convenient. When the knife 46 is lowered ready for action upon the necks of the fish in the holders, the shank 60 will rest upon the pin 59 within the auxiliary standard 55 and the opposite end of the knife will be supported upon the pivot 47 in the standard or link 48. When the operation of decapitating is desired, the knife is forced still farther downward and resting upon the pivot, supports 48 and 55, will be prevented from descending in a perpendicular course, but will be caused to travel longitudinally as it descends, due to the tipping down of the standards 48 and 55, and thus produce a shearing cut upon the fish which is essential to the satisfactory severing of so delicate an object.

The mechanism for salting the fish will now be described. Upon the outside walls of each of the two extreme outside guide-blocks 29 is rigidly fixed an upwardly projecting angular block or bracket 64—64 which have pivotally mounted therein at 65 arms 66—66 which normally extend upwardly and have attached to their uppermost ends a salt box supporting bar 67 which carries rigidly fixed thereto intermediate its ends a salt box 68. The said box may be of any desired construction, but of a dimension extending from the bar a distance substantially equal to the longitudinal opening formed within the fish to be salted, so that when the salt box 68 is lowered for action above the fish as is shown in dotted lines in Fig. 3, it will supply salt to the entire exposed area of the fish just cleaned. A series of holes 69 are formed in the side of the box and are placed directly in alinement with each fish to be salted through which the salt is supplied from the box to the fish when desired. The holes 69 are of a size so that when the box is in its normal vertical position, salt will not be discharged therefrom to any considerable extent, but when lowered to a horizontal position and shaken, will readily dispense the salt upon the fish within the holders simultaneously.

A cover 70 of the salt box 68 may be made so as to be slidable longitudinally the box and readily removable for replenishing the supply of salt when the box is in its uppermost position. The arms 66—66 are retained normally in a vertical position by means of angular springs 71 as is shown in Fig. 4 which are arranged in a manner identical with the springs 62 which engage the arm 37 of the knife supporting racks. A ledge 72 is formed upon the inside of each bracket 64 and upon which the arms 66 rest when lowered to their extreme horizontal position, and are supported within this position by the said ledge 72.

After the fish have been cut open and cleaned, it is necessary to wash them and for this purpose a water supply pipe 73 is installed adjacent the side of the floor 1 opposite to that upon which the decapitating knife 46 is mounted. The pipe 73 is provided with a section 74 pivotally attached thereto by means of an elbow connection 75 and 76 whereby the section 74 may be lowered to a point just above the fish within the holders, or the said section may be left standing vertically as is shown in the drawings. The end of the section 74 is stopped with a suitable cap 77 and is provided with a plurality of holes 78 which are so positioned as to occur just above each fish within the holders when the section 74 is lowered to a point just above and parallel with the fish. After the fish have been operated upon by the knives as above described, water may be turned on by a valve 79 and the fish all washed out simultaneously. After this operation is completed, the section 74 may be quickly returned to its original position.

While I have shown the decapitating knife as being pivoted at one side of the fish holders, it may be found practical to suspend it in a pivotal frame similar to those which support the salt box and fish engaging knives which may in some instance prove a more compact and convenient method.

Figure 2:
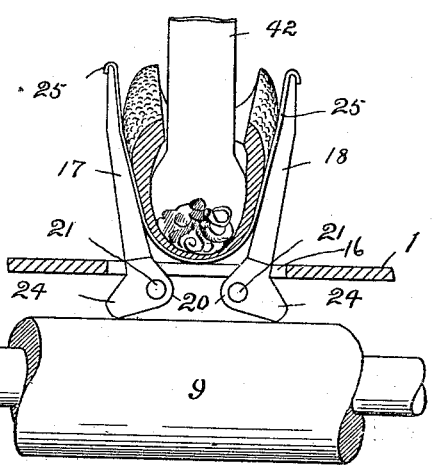
Fig. 2 is an enlarged front view of one of the fish holders showing the same in an open position.

The operation of the device is as follows: Assuming the machine to be positioned in readiness for the operation of cleaning fish, a fish is placed preferably back up within each pair of holders. The shaft 5 is then revolved to present the greatest projecting portion of the eccentric 9 to the crank arms 24 of the holders which will cause the said holders to tightly close around each fish. The bar 39 carrying the knives 41 is then brought downward and forward, either directly by hand or by revolving its coöperating shaft 8 as above explained until the points of the knives 41 are directly over the most forward end of the cut to be made in the backs of the fish. The bar is then forced downward vertically to its limit which will cause one of the knives 41 to pierce each fish through to its abdominal cavity. Then the bar is moved longitudinally backward until the fish are split the entire length of the said cavity at which time the bar 39 is raised and allowed to assume its inactive vertical position. The decapitating knife 46 is then brought down and the heads of the fish severed from their bodies as has been before described. The eccentric 9 is then turned to its opposite position which will open the holders and allow the fish to assume an opened position as illustrated in Fig. 2. The bar 38 carrying the intestine severing knives 43 is then brought forward and lowered until the knives enter the opened cavities of the fish, preferably just forward of the rearmost portion thereof. If the fish happen to be of an unequal length, they are lined up rearwardly by pushing the bar 38 backward until the knives 43 engage the rear termini of the openings in all of the fish at which time the bar 38 is forced downward to the limit of its lowermost travel which will cause the severing of the recta of the fish by the knife blades 44. While these knives still remain in position, the bar 40 carrying the eviscerating blades 42 is brought forward and lowered with the blades 42 directly in front and close to the knives 43 so that they may be sure to remove all of the entrails from the fish. The bar 40 is then drawn toward the operator quickly thereby making the act of evisceration complete when the last two mentioned bars are returned to their normal vertical positions.

Any suitable form of shield, not shown, may be installed in front of the machine to protect the operator while the machine is working. After the fish have been cut and cleaned as above described, the section 74 of the water pipe is brought down over them, the water turned on and the fish thoroughly cleansed by a single application. The pipe 74 is then returned to its original position and the salt box 68 swung down to a point directly over the now open and clean fish and by a slight jarring of the box the salting of the fish is accomplished. The box is then returned to its inactive position and the fish removed leaving the machine ready for a subsequent trick.

Having thus fully described my invention what I claim and desire to secure by Letters Patent is:

1. A fish cleaning mechanism comprising a framework, fish holding devices carried by the said framework, movable members mounted upon the said framework, knives carried by the said members, the said knives adapted to be brought in contact with the fish.

2. A fish cleaning mechanism comprising a framework, fish holding devices carried thereby, members movably mounted upon the framework, a plurality of knives carried by the said members, said members movable toward and away from the fish in a vertical plane and thereby adapted to bring the knives in engagement with the fish within the holders.

3. A fish cleaning mechanism comprising a base, fish holding devices carried thereby, a plurality of U-shaped members having their ends pivotally mounted upon the base, cleaning knives carried by the said members, said members movable toward and away from the fish in a vertical plane.

4. A fish cleaning mechanism comprising a framework, fish holding devices mounted thereupon, a plurality of U-shaped members of graduated sizes arranged one within the other and having their ends pivotally mounted upon the framework, a plurality of knives carried by the said members, said members movable toward and away from the fish in a vertical plane, and means for normally holding the said members in a vertical position.

5. A fish cleaning mechanism comprising a framework, a plurality of fish holding devices mounted thereupon, a plurality of U-shaped members of graduated sizes mounted one within the other, the lower ends of the said members pivotally connected to the framework, a plurality of knives carried by the said members, the said members movable toward and away from the fish in a vertical plane, and means for normally holding the said members in a vertical position, and a decapitating knife located at one side of the framework and in a line with the front end of the fish holding devices, said knife adapted to swing in a vertical plane and engage the necks of the fish held within the holding devices.

6. A fish cleaning mechanism comprising a framework, a plurality of fish holding devices carried thereby, a plurality of U-shaped members of graduated sizes mounted one within the other, a plurality of longitudinally movable members mounted within the framework, the lower ends of the said U-shaped members pivotally connected to the said longitudinal members, the said U-shaped members movable in a vertical plane in reference to the fish holding devices, a plurality of cleaning knives, carried by the said members, the parts arranged as and for the purpose described.

7. A fish cleaning mechanism comprising a framework, a plurality of fish holding devices mounted thereupon, a plurality of U-shaped members of graduated sizes mounted one within the other, the lower ends of the said members pivotally connected to the framework, a plurality of knives, carried by the said members, said members movable toward and away from the fish in a vertical plane, means for normally holding the said members in a vertical position.

8. A fish cleaning mechanism, comprising a framework, fish holding devices carried by the said framework, the said devices adapted to clamp and release the fish, movable members mounted upon the said framework, knives carried by the said members, the said knives adapted to be brought in contact with the fish.

9. A fish cleaning mechanism, comprising a framework, fish holding devices carried by the said framework, said devices adapted to clamp and release the fish, and means adapted to operate all of the fish holding devices simultaneously, movable members mounted upon the said framework, and knives carried by the said members, the said knives adapted to be brought in contact with the fish.

10. A fish cleaning mechanism, comprising a framework, fish holding devices carried by the said framework, said devices comprising a saddle to receive the fish, supporting members for the said saddle, means engaging the lower ends of the said supporting members to open and shut the said saddle, movable members mounted upon the said framework, knives carried by the said members, the said knives adapted to be brought in contact with the fish within the holding device, the parts arranged as and for the purpose described.

11. A fish cleaning mechanism comprising a framework, a plurality of fish holding devices carried by the framework and arranged in a line one beside the other, said devices comprising U-shaped saddle supporting members for the said saddle, an eccentric roller mounted in the framework and engaging the lower ends of the said supporting members, whereby the fish within the saddles are clamped and released as the eccentric engages or releases the lower ends of the supporting members, movable members mounted upon the said framework, and knives carried by the said members, the said knives adapted to be brought in contact with the fish within the holding devices.

12. The combination with a fish cleaning device having a pivotally operated decapitating knife of a plurality of fish holding devices, a plurality of knives and cleaning elements pivotally mounted adjacent the holding devices and means for manually bringing the knives and cleaning devices in contact with fish within the holders.

13. In a fish cleaning device, the combination with a plurality of fish holding means of a decapitating knife pivotally mounted adjacent the holding means whereby a plurality of fish within the holders may be decapitated simultaneously.

14. In a fish cleaning device, the combination with a plurality of fish holding means, of a salting mechanism pivotally mounted adjacent the holding means, whereby a plurality of fish within the holders may be salted simultaneously.

15. In a fish cleaning device, the combination with a plurality of fish holding means, a plurality of knives, cleaning elements and salting means carried by the framework, and means for manually bringing the knives, cleaning devices and salting mechanism in contact with the fish within the holders.

In testimony whereof I hereunto affix my signature in the presence of two witnesses.

EDWARD P. FOLLETT.

Witnesses:
W. H. DENHAM,
S. GEO. STEVENS.

Copies of this patent may be obtained for five cents each, by addressing the "Commissioner of Patents, Washington, D. C."